United States Patent [19]

Decker et al.

[11] 3,905,688
[45] Sept. 16, 1975

[54] APPARATUS FOR DETERMINING THE ACUITY OF A HUMAN

[75] Inventors: Thomas A. Decker; Christian L. Kuether, both of Houston; Robert E. Williams, Pearland; Noel D. Logar, Houston, all of Tex.

[73] Assignee: Baylor College of Medicine, Houston, Tex.

[22] Filed: Sept. 24, 1973

[21] Appl. No.: 400,410

[52] U.S. Cl. .................. 351/30; 351/36; 351/37
[51] Int. Cl.² ...................................... A61B 3/02
[58] Field of Search ............ 351/30, 32, 36, 37, 17, 351/39

[56] References Cited
UNITED STATES PATENTS

| | | | |
|---|---|---|---|
| 3,486,813 | 12/1969 | Johnston | 351/36 X |
| 3,639,042 | 2/1972 | Grolman | 351/30 |
| 3,684,355 | 8/1972 | Molner | 351/30 X |
| 3,705,003 | 12/1972 | Lynn et al. | 351/17 X |
| 3,718,386 | 2/1973 | Lynn et al. | 351/37 X |
| 3,737,217 | 6/1973 | Haines | 351/30 X |

*Primary Examiner*—Paul A. Sacher
*Attorney, Agent, or Firm*—Fulbright & Jaworski

[57] ABSTRACT

An acuity meter for presenting visual acuity targets to the eye of a human subject being tested in order to determine accurately and conveniently the acuity capability of his visual system. The apparatus includes an optical display which presents a plurality of targets, one at a time, to the person being tested, a set of switches by which the person being tested indicates his response, and an electronic control system which controls the presentation of the targets in accordance with the subject's response, measures the subject's responses, and determines the subject's threshold acuity value. The control means includes means for randomly selecting one of a plurality of targets at each acuity level being tested. The optical display system includes an endless loop of film and a system of a lens and prism to compactly produce a target at optical infinity so that the eye distance of the subject has no effect on angular size of the target.

2 Claims, 5 Drawing Figures

3,905,688

APPARATUS FOR DETERMINING THE ACUITY OF A HUMAN

BACKGROUND OF THE INVENTION

Currently used methods for measuring the visual system of a human usually employ a wall chart, such as the Snellen type, or an acuity projector and a screen in a 20-foot room. In addition, a research article published by Edward R. F. W. Crossman and Peter J. Goodeve and Elwin Marg, "A Computer-based Automatic Method for Determining Visual Acuity", American Journal of Optometry and Archives of American Academy of Optometry, Volume 47, pages 344–355, dated May, 1970, discloses an automatic software program for controlling a slide projector for making visual acuity determinations.

The present invention is directed to an improved acuity meter which is self-contained and portable, which does not require a 20-foot room, which presents a series of visual stimuli or targets to a human being tested for obtaining and measuring his responses to the targets, and on the basis of a predetermined defined criterion, determines the subject's visual acuity threshold.

The present invention is directed to a self-contained portable acuity meter for testing visual acuity under a standard set of conditions and criteria requiring only simple tasks and judgment from the subject being tested without requiring the use of cumbersome, fixed equipment or the need for a fixed environment such as the usual 20-foot room.

In addition, the present acuity meter includes an optical system using a lens and prism to compactly produce a target at optical infinity so that the eye distance of the subject has no effect on the angular size of the target.

In addition, another object of the present invention is to provide an acuity meter having a control circuit which uses the subject's response to select the size level of the next target, thus placing the subject in a feedback loop in which the control circuit "settles" at the subject's visual acuity threshold.

A still further object of the present invention is the provision of an acuity meter which randomly selects the specific target to be shown to the subject, thus precluding any possibility of memorizing correct responses thereby permitting repeated testing of a subject for any or various reasons.

Another object of the present invention is the provision of an acuity meter in which the subject being tested, through a series of extremely simple discriminations, actually controls the size of the test target presented to him, instead of merely reacting to a preset list of letters or other acuity targets which someone else presents to him. This allows the subject to control the relevant variable and removes unnecessary operator influences and maximizes the subject's attention.

Other and further objects, features and advantages will be apparent from the following description of a presently preferred embodiment of the invention, given for the purpose of disclosure, and taken in conjunction with the accompanying drawings.

DESCRIPTION OF THE PREFERRED EMBODIMENT

Figure 1:
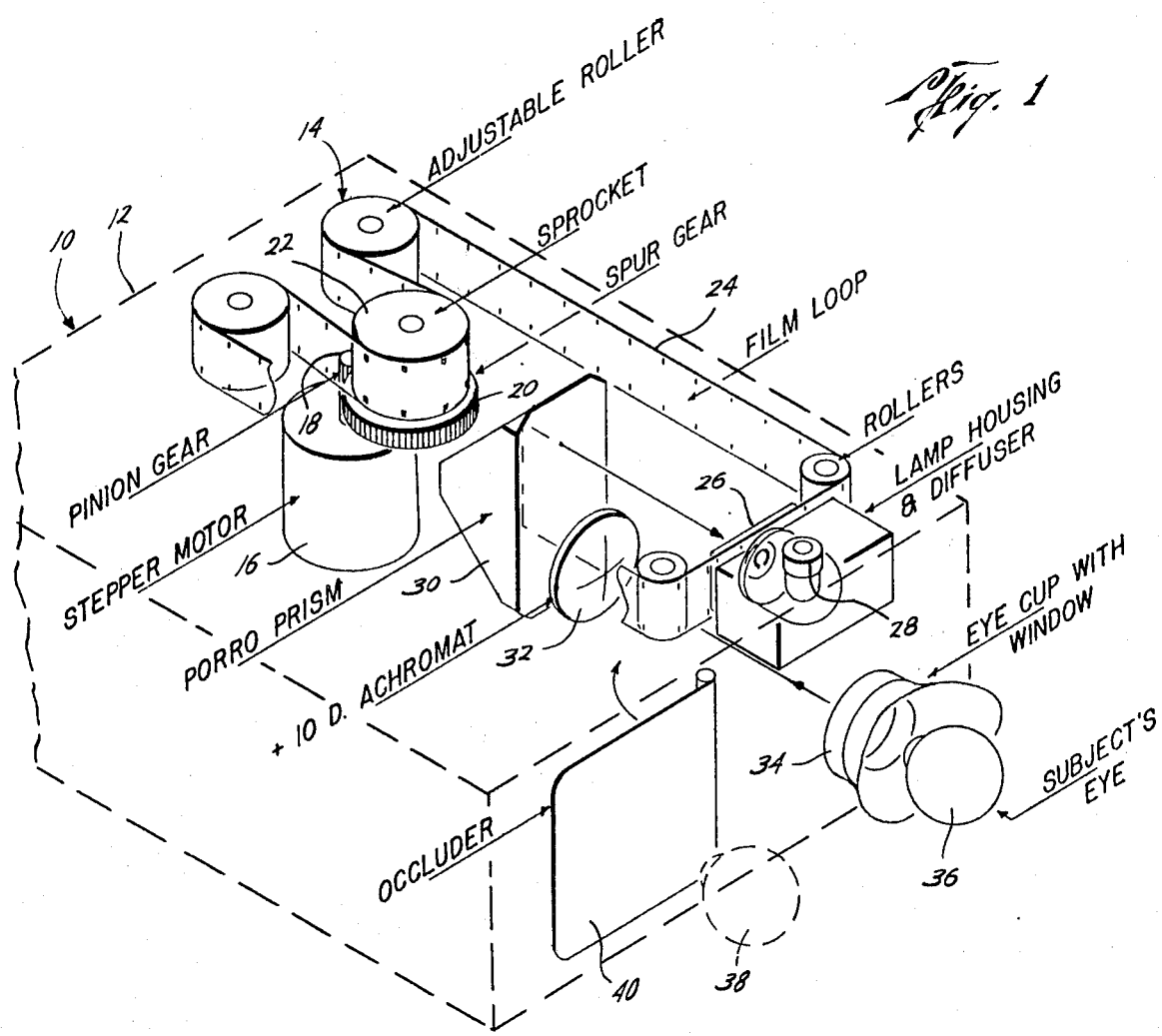
FIG. 1 is a fragmentary, perspective view of the optical system of the present invention.
Figure 3:
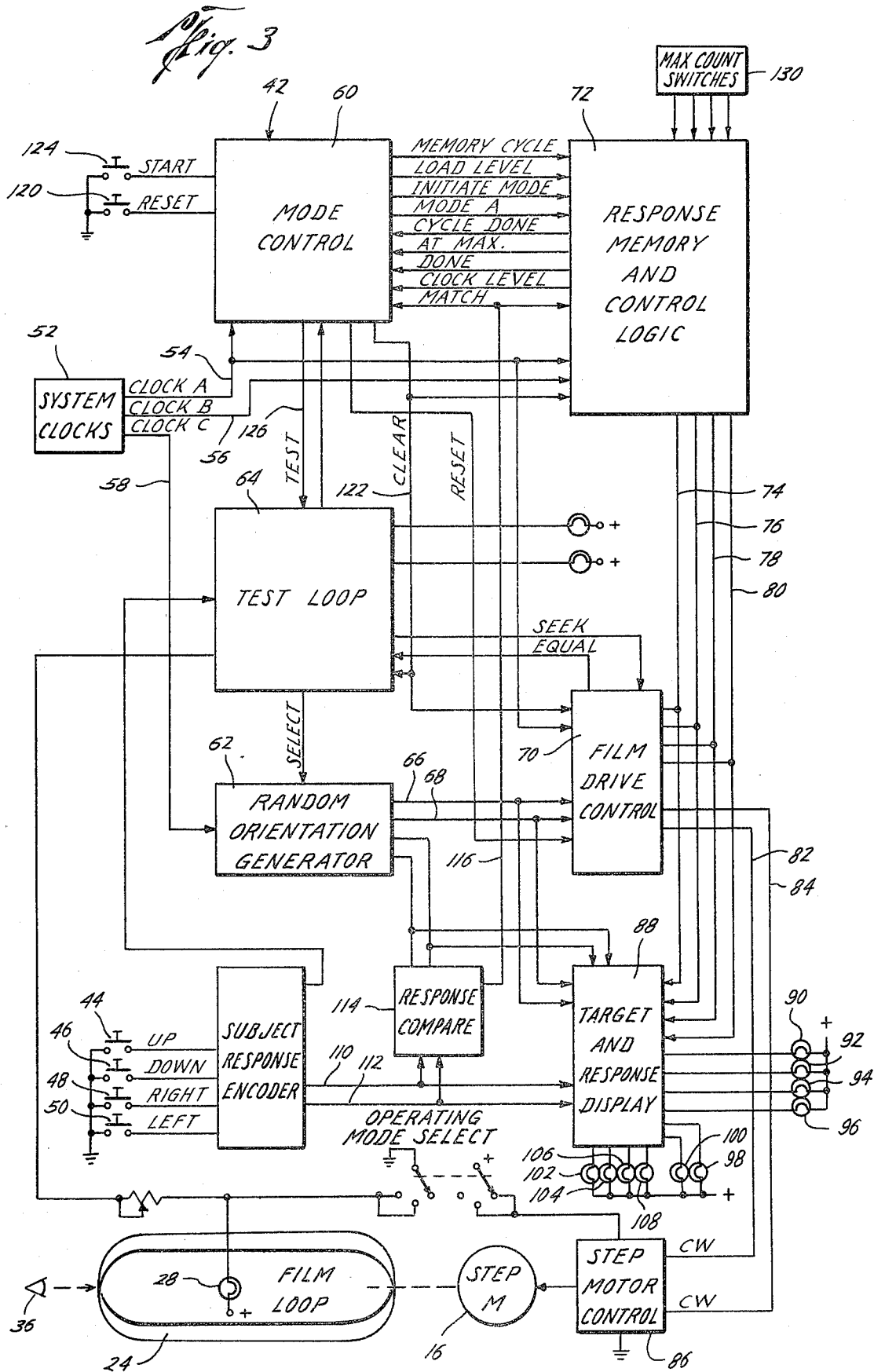
FIG. 3 is an electrical block diagram of the present invention.

Referring now to the drawings, and particularly to FIGS. 1 and 3, the apparatus of the present invention is generally indicated by the reference numeral 10 and includes a housing 12 shown in dotted outline, consisting of a small self-contained portable box housing the optical system generally indicated by the reference numeral 14. The optical system 14 may include a stepper motor 16 driving, through a pinion gear 18, a spur gear 20 and a sprocket 22, a continuous 16 mm film loop 24 through a film gate 26. A lamp 28 illuminates the film frame within the gate 26, and a porro prism 30 and a lens 32 optically fold the light path and collimate the target to present a virtual image at optical infinity through an eye cup and window 34 to be observed by the subject's eye 36. The eye 38 which is not being tested is covered by a spring-mounted occluder 40 during testing. It is noted that this compact and portable optical system produces a target at optical infinity so that the eye distance of the subject has no effect on angular size of the target and the optical system 14 is not dependent upon the size of the room in which the subject is being tested.

While any suitable target may be utilized for testing purposes, one that has been found satisfactory is the Landolt C type targets. The film loop 24 includes a plurality of such visual targets including a plurality of targets at each of a plurality of acuity levels. For example only, the film loops 24 may include 56 frames having one Landolt C target photographed in each of the frames. Preferably, 14 different sizes of Landolt C targets represent acuity levels of 20/200, 20/160, 20/125, 20/100, 20/80, 20/60, 20/50, 20/40, 20/30, 20/25, 20/20, 20/16, 20/13 and 20/10. At each acuity level, a Landolt C is provided with the gap in the C in any of four orientations: up, right, down, or left.

The prime mover for the film loop 24 is the dc stepper motor 16. A 45° step by the stepper motor moves the film 24 1/8th frame and thus a one frame movement requires eight stepper motor steps.

At the start of the test, the subject being tested sees a 20/200 Landolt C with the gap in one of the four orientations (up, down, right, left). The subject indicates his identification of the position of the gap by pressing one of four switches corresponding to his selected orientation. At the outset of the testing (mode A) successive trials change to greater acuity levels by two levels (that is 20/200 to 20/125) until the first error is made. Thereafter, mode B is utilized in which the acuity level changes up or down in single level steps. If the response is correct, the subject is given a subsequent trial with a smaller target (greater acuity) or if wrong, a larger target (lesser acuity). The trials continue until a preselected number of responses occur on any acuity level. This criterion is entered by the operator at the beginning of the test. The threshold value of acuity is thus that level where the criterion test of responses is first obtained, and on which the test terminates.

Figure 2:
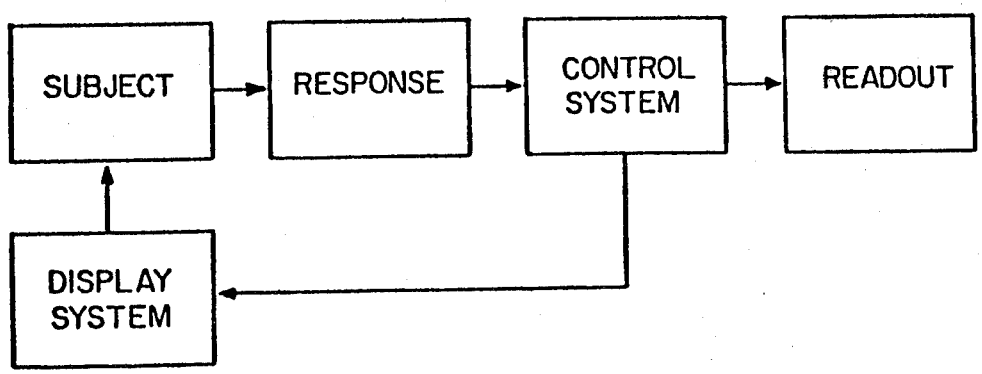
FIG. 2 is a block diagram of the operation of the present device.

In this manner, the subject's response determines the acuity level and the control system will "track" the subject's responses until it arrives at a determination of the subject's acuity threshold. In addition to providing a highly standardized set of test conditions, the subject himself is the controlling element in a "feedback loop" as shown in FIG. 2.

Referring now to the electrical block diagram of FIG. 3, generally indicated by the reference numeral 42, a plurality of switches 44, 46, 48 and 50 are provided which the subject being tested presses and which correspond to his perception of the position of the gap in the Landolt C target which he views through the eye cup window 34. The subject being tested is instructed that if he is unable to clearly see the gap in the C that he should make his best guess of the orientation and that only when he is forced to guess can his acuity threshold be determined. For example, if the Landolt C is upright, the subject would press switch 48 which indicates that the gap in the C is oriented to the right.

The electrical control circuit 42 includes a system of clocks 52 having one or more oscillators to provide Clock A, Clock B and Clock C timing signals, respectively, through lines 54, 56 and 58. A mode control 60 is provided which determines whether or not the electrical system is operating in mode A which causes the targets on the film strip 24 being presented to the subject being tested to change size level downwardly by two acuity levels or whether the system is operating in mode B which causes the targets on the film loop to change either upwardly or downwardly in size, but only one acuity level at a time.

The Clocks A and B outputs on lines 54 and 56 are two phase alternating timing signals and the Clock C output on line 58 is a different frequency whose output is transmitted through a random orientation generator 62 to randomly select, when actuated by the test loop 64, an output signal on lines 66 and 68 to present a two-bit signal to the film drive control 70. The two-bit signal on lines 66 and 68 therefore randomly selects one of the four Landolt C targets at the particular level being tested which insures that there is no possibility that the subject being tested can memorize the correct responses. This allows repeated measurements to be obtained on a single subject. A response memory and control logic circuit 72 is provided having lines 74, 76, 78 and 80 connected to the film drive control for providing a four-bit signal which determines the acuity level to be presented to the subject. When the film drive control 70 has received the level control signals 74, 76, 78 and 80 and the random orientation signal from lines 66 and 68, the film drive control 70 may through its output on lines 82 and 84 control a step motor control 86 causing the step motor 16 to move the film loop 24 to present the selected target to the eye 36 of the subject being tested.

A target and response display circuit 88 is provided which also receives the output signals from lines 66 and 68 as well as the output signals from lines 74, 76, 78 and 80. Display 88 in turn includes indicating lights so that the testing operator may by observing the display lights observe the testing of the subject. Thus, lights 90, 92, 94 and 96 digitally readout the acuity level currently being displayed to the patient. Lights 98 and 100 show in digital form the random frame being diaplayed to the subject being tested, that is, whether the C is up, down, right or left.

In addition, the target and response display 88 includes lights 102, 104, 106 and 108 which digitally readout the results of the last test of the subject being measured. The test results are obtained when the subject being tested actuates one of the switches 44, 46, 48 and 50 which are encoded in digital form on lines 110 and 112. The encoder is also connected by the lines 110 and 112 to a response compare circuit 114 which compares the response with the output from the random orientation generator 66 to provide an output signal on line 116 indicating whether the subject's response was correct or incorrect.

In use, an electrical reset button 120 is actuated to provide a "reset" signal to set the test loop 64, the film drive control 70 and the memory and level counter and the response memory and control logic 72 to initial conditions. A start button 124 is actuated and the mode control 60 is placed in mode A, the test loop 64 is actuated through line 126 to select at random a target orientation from the random orientation generator 62 which is actuated from Clock C in line 58 to provide a selection of an orientation frame through lines 66 and 68 to the film drive control 70. Simultaneously, a signal is sent out over lines 74, 76, 78 and 80 which initially selects an acuity level of a 20/200 target. The particular frame on the film loop 24 which has been selected causes a signal to be sent over lines 82 and 84 through the step motor control 86 to actuate the step motor 16 to bring the selected frame on the film loop 24 into alignment with the frame housing 26 and in view of the subject's eye 36. The subject being tested then views the selected orientation target of the 20/200 acuity size and makes an initial determination by actuating one of the switches 44, 46, 48 and 50. If his initial discrimination is incorrect, the test is terminated. If his initial response is correct as determined in the response comparator 114, a signal is sent on line 116. At this time, the system is operating in mode A which means that the system will skip down two acuity levels and present another target of random orientation at the 20/125 level. Therefore, as long as the subject being tested continues to make correct responses, the targets will change by two acuity levels to a maximum value of 20/10.

As soon as the subject makes his first incorrect response, the output from line 116 actuates the mode control to change the control mode from mode A to mode B in which the targets are changed only one acuity level at a time, larger if the previous response was incorrect, and smaller if the previous response was correct. In this manner, the subject's responses determine the acuity level to which he is being subjected. After each response, the current trial count for the acuity level just tested is loaded from memory into a counter and the counter is then incremented. This incremented trial count is then written back into the memory. That is, the circuit 72 includes a memory which keeps track of the number of trials at each acuity level and includes a counter which is loaded from the memory for recording the number of trials, whether correct or incorrect, at each acuity level. That is, each of the 14 acuity levels has associated with it a memory register which records the number of trials that have been presented to the subject at that level. Each target is presented at any one of the fourteen levels only a predetermined number of times, called a "criterion" entered by a maximum switch 130 count. While the subject is tracking his threshold he is accumulating a large number of tests at, immediately above, and immediately below his threshold. The first level to accumulate the required number is read out at his threshold level.

Figure 4:
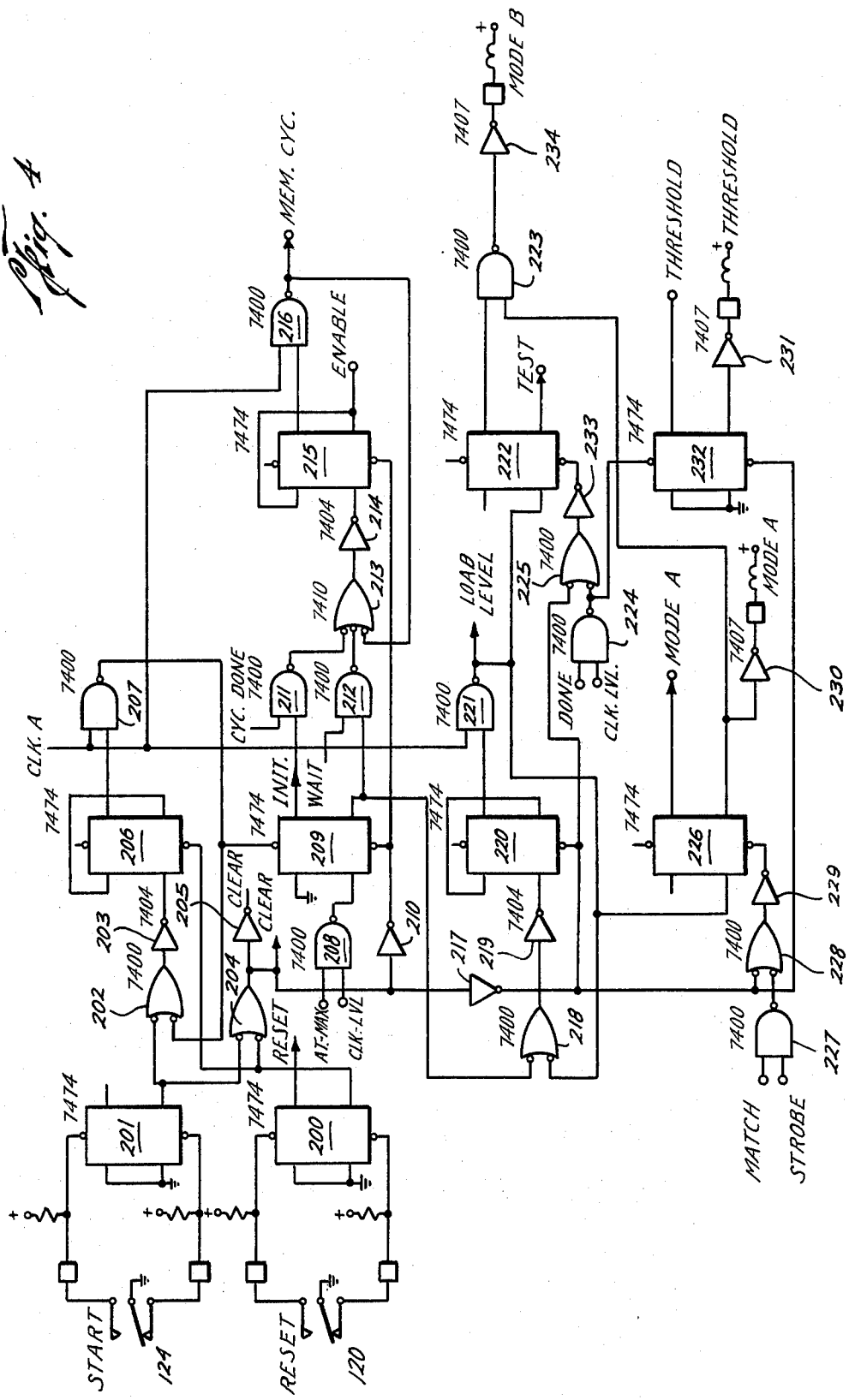
FIG. 4 is an electrical schematic of the mode control.
Figure 5:
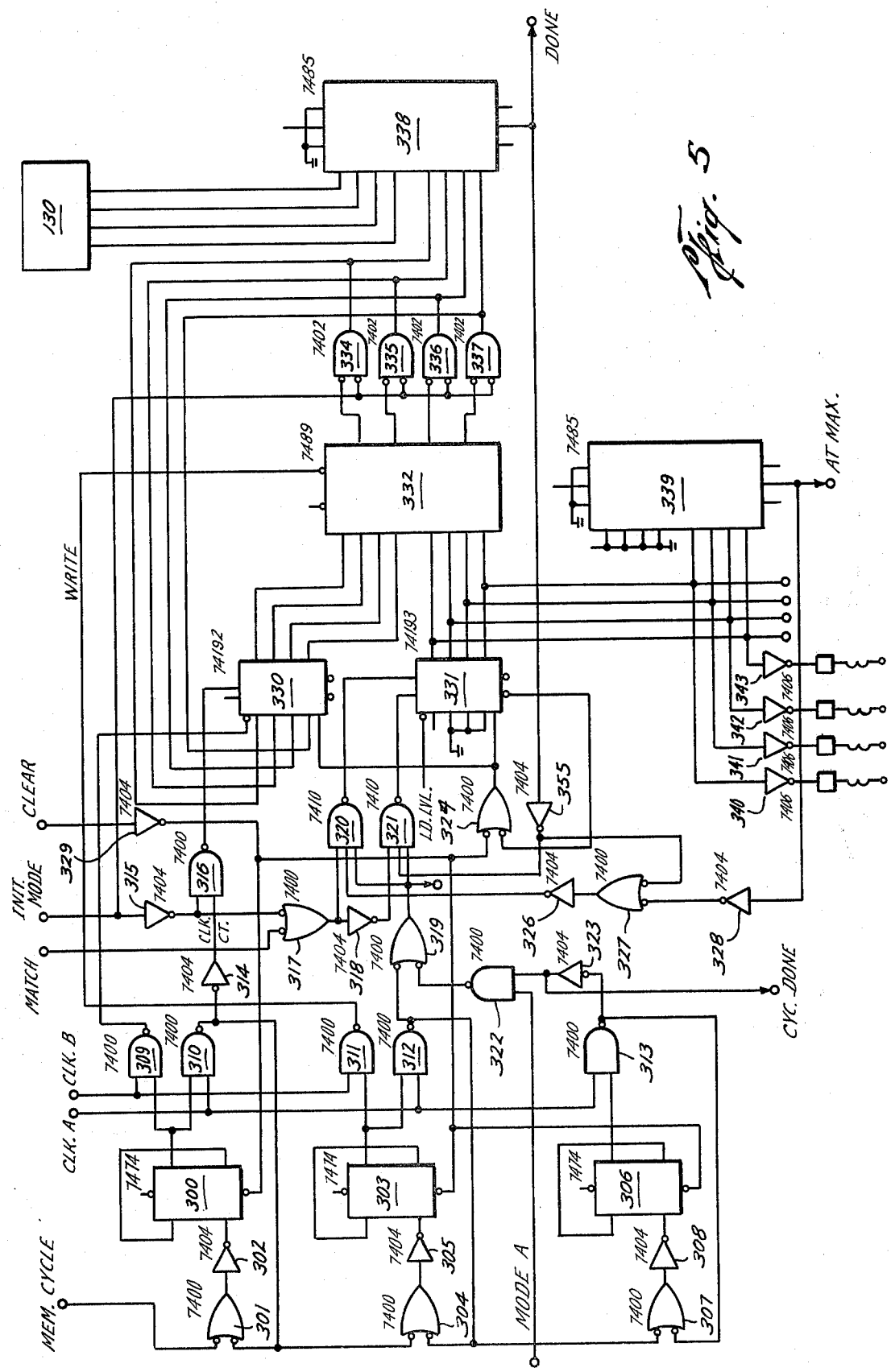
FIG. 5 is an electrical schematic of the memory and control logic.

A preset threshold number is set into the response memory 72 by a maximum count switch or criterion switch 130. If the count at the last level being tested has not yet reached the preset maximum count number set by the switch 130, the acuity level testing will again be changed as before: up two levels if correct in mode A; up one level if correct in mode B; or down one level if incorrect in mode B. So long as the trial counts have not reached the threshold criterion, as set by switches 130, the test continues through another trial. During all of the testing, the memory keeps track of the number of trials at each level and is incremented after each trial is compared with the criterion set to see if the test is completed. When the criterion count has been reached, that is, the subject being tested has made a predetermined number of responses, whether correct or incorrect, at a particular acuity level, the test is completed and the operator may read the threshold acuity by observing the acuity level indicator lights 102, 104, 106 and 108 which are the acuity level. There are, of course, many ways to implement the circuitry represented by the block diagram of FIG. 3 to achieve the desired results. One of these ways is described more fully and is shown in greater detail in FIGS. 4 and 5. It is further understood that while the circuitry described in FIGS. 4 and 5 is the widely used 7400 series of Transistor, Transistor Logic (TTL), other logic families could be used in a successful implementation. The detailed logic drawings use the MIL-806B symbols and techniques in order that one skilled in the field might easily follow. Labeled logic lines are TRUE when at the more positive of the two Logical states.

After the power is turned on, the Reset button 120 may be pressed generating through debounce flip flop 200, RESET which goes to the FILM DRIVE Control 70 to set it to frame zero. Also RESET is OR'ED by gate 204 and 205 to produce CLEAR 122, which among other things reset the INITIATE mode flip flop 206, the TEST mode flip flop 222, the MODE A flip flop 226, the THRESHOLD flip flop 232, and others of other blocks and then the film is positioned to frame zero, which may be a bullseye target, to agree with the FRAME DRIVE counter of the Film Drive Control block 70. Now the circuitry is ready to be actuated to test the individual. Pressing the START button 124, debounced with flip flop 201, generates a START signal which is the other input of OR gate 204, which insures that all functions are cleared as before with the exception of the FILM DRIVE Counter. Thus once frame zero has been set up, the RESET button 120 need not be used after each test, only the START button 124 need be used. The START signal also clocks flip flop 206 through OR 202 and 203. Then the first Clock A pulse is enabled by output from AND 207 which sets the INITIATE mode flip flop and then resets flip flop 207 by virtue of feeding into OR 202 and 203 since $\overline{Q}$ of flip flop 206 is fed back to its D input. The setting of the INITIATE mode also sets ENABLE through gates 212, 213 and 214 since $\overline{WAIT}$ is high. Then the next Clock A generates a MEMORY CYCLE signal through gate 216 which also clears ENABLE through or function 213 and 214, and $\overline{Q}$ is D feed back. The ensuing memory cycle clears the RESPONSE COUNT for level zero and when this is done as with every memory cycle a CYCLE DONE signal is generated. Since INITIATE mode is set, the memory level counter was advanced by one to Level 1 and through gate 211 another MEMORY CYCLE is requested, thus zeroing the RESPONSE COUNT for Level 1 then incrementing to Level 2 and sending back CYCLE DONE. This sequence continues, sequentially zeroing the RESPONSE COUNT for every level until AT MAX and CLOCK LEVEL are present at gate 208 resetting the INITIATE mode before CYCLE DONE can trigger another MEMORY CYCLE clearing INITIATE also triggers flip flop 220 through OR 218 and 219. The first Clock A then generates a $\overline{\text{LOAD LEVEL}}$ signal to the memory logic to set the level to, Level 1 so that the first target displayed will be a 20/200 target. LOAD LEVEL also feeds back through OR 218 and 219 to clear flip flop 220, sets MODE A, and also clocks flip flop 222 setting TEST mode. Setting test mode initially triggers the TEST LOOP 64 and enables the TEST LOOP 64 to be subsequentially triggered upon the completion of each memory cycle by CYCLE DONE, until DONE and CLOCK LEVEL occur to reset TEST and to set the THRESHOLD flip flop 232. Each time the test loop is actuated (1) a random orientation is selected by clocking the output of a two-bit free running counter into the orientation flip flops and (2) initiating the film drive circuitry so that the FILM DRIVE COUNTER counts up or down until its contents equal that indicated by the level and ORIENTATION FLIP FLOPS. Then the eye will see the proper frame since after the film stops moving, the logic enters WAIT mode and the lamp 28 is turned on. Upon a response from the subject by pressing any of the four Subject Response switches 44, 46, 48 or 50, the UNIT goes out of WAIT mode which causes a signal at the output of gate 212 which initiates a MEMORY CYCLE. After the subject responds, a check is made to see if the answer is incorrect at gate 227, by ANDING $\overline{\text{MATCH}}$ (true, if incorrect) and STROBE. If so, MODE A is reset.

A description of the RESPONSE MEMORY and CONTROL LOGIC block 72 is best seen in FIG. 5. MEMORY CYCLE, normally low, goes high, flipping flip flop 300 through OR function 301 and 302. This occurs on the trailing edge of CLOCK A. The next Clock B then occurs and generates $\overline{\text{LOAD COUNT}}$ which loads either the contents of the selected 4 bits of memory 332 if not in INITIATE MODE or all zeros if in INITIATE MODE, into the 4 bit counter 330. The 4 bit level counter 331 selects which of the 16 groups of 4 bits in the memory appears at the memory's outputs (S1–S4). The memory outputs are gated by INITIATE MODE 334–337. The next CLOCK A that occurs generates a CLOCK COUNT Pulse through 310 and 314 which if increments counter 330 through gate 316 if not in INITIATE MODE. The pulse at 310 also feeds back to reset flip flop 300 through OR 301 and 302, and sets flip flop 303 through OR 304 and 305. The next Clock B generates $\overline{\text{WRITE}}$ which writes the contents of counter 330 back into memory 332, thus having the effect of incrementing the selected 4 bit count contained in memory for the selected LEVEL contained in counter 331, if not in INITIATE MODE or if in INITIATE MODE of clearing the 4 bits. The next Clock A generates a CLOCK LEVEL pulse through gates 312 and OR 319 which increments the level counter 331 if there is a MATCH (a correct response) or if in initiate mode (Gate 317) or decrements the LEVEL Counter or an incorrect response ($\overline{\text{MATCH}}$), through gate 321. The LEVEL Counter is neither incremented or decremented if the new RESPONSE Count in memory presented to comparator 338 agrees with the MAX count (CRITERIA) as the final LEVEL has been reached and no further responses at a new level are required. This level is always displayed via drivers 340–343 and is never allowed to exceed a prewired max count set here at 14 at inputs A$\phi$–A3 of compacitor 339. When the level count reaches 14, the signal AT MAX inhibits further up counts to the level counter via gates 328, 327, 326 and 320.

This same CLOCK A also clears flip flop 303 via OR 304 and 305 and sets flip flop 306 via OR 307 and 308. The next Clock A generates another clock level if still in MODE A (gate 322) this signal is generated by gate 313 and 323 which is called CYCLE DONE which denotes the end of the current memory cycle.

The attendent functions of display and stop motor driving are familiar in such circuitry and need not be discussed here.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. A self-contained, portable self-controlling device for determining the acuity capability of the visual system of a human subject comprising, a housing, an eye window in the housing in which the subject being tested looks, a plurality of visual acuity targets positioned in the housing including a plurality of targets at each of a plurality of acuity levels, an optical display system in said housing presenting a virtual image of one of the targets at optical infinity through the eye window, a set of switches adapted to be actuated by the subject being tested to indicate his response to the target presented through the window, control means electrically connected to the switches and said optical display system, said control means controlling the presentation of targets in response to the switch actuated by the subject being tested by presenting a larger subsequent target each time the subject incorrectly identifies the preceding target, and presenting a smaller subsequent target each time the subject correctly identifies the preceding target, and said control means includes means for determining the level of acuity of the subject, said determining means includes means for counting the number of times that the subject was tested at each particular level of acuity, and displaying that level at which a predetermined count is first reached, regardless of the correctness or incorrectness of each individual response.

2. The apparatus of claim 1 wherein the control means includes means for selecting the sequence of presentation of viewed targets, from a plurality of targets, on a random basis thereby precluding memorization of predetermined testing sequences.

* * * * *